C. C. PAGE.
WRAPPING MACHINE.
APPLICATION FILED APR. 6, 1909.

952,273.

Patented Mar. 15, 1910.
8 SHEETS—SHEET 2.

Witnesses
Edwin L. Bradford

Inventor
Clarence C. Page
By Hargrave & Morris
Attorneys

C. C. PAGE.
WRAPPING MACHINE.
APPLICATION FILED APR. 6, 1909.

952,273.

Patented Mar. 15, 1910.
8 SHEETS—SHEET 6.

Witnesses
Edwin L. Bradford
G. P. Ritter

Inventor
Clarence C. Page,
Hargrave & Morris,
His Attorneys.

C. C. PAGE.
WRAPPING MACHINE.
APPLICATION FILED APR. 6, 1909.

952,273.

Patented Mar. 15, 1910.

C. C. PAGE.
WRAPPING MACHINE.
APPLICATION FILED APR. 6, 1909.

952,273.

Patented Mar. 15, 1910.
8 SHEETS—SHEET 8.

Witnesses
Edwin L. Bradford
G. P. Ritter

Inventor
Clarence C. Page,
By Hargrove & Morris,
His Attorney

UNITED STATES PATENT OFFICE.

CLARENCE C. PAGE, OF PORTLAND, OREGON, ASSIGNOR OF ONE-HALF TO ROBERT TUCKER, OF PORTLAND, OREGON.

WRAPPING-MACHINE.

952,273.     Specification of Letters Patent.    Patented Mar. 15, 1910.

Application filed April 6, 1909. Serial No. 488.193.

*To all whom it may concern:*

Be it known that I, CLARENCE C. PAGE, a citizen of the United States, residing at Portland, in the county of Multnomah and State of Oregon, have invented certain new and useful Improvements in Wrapping-Machines, of which the following is a specification.

My invention relates to the construction of machines for automatically wrapping or enveloping articles of merchandise with paper or other suitable flexible material, and has for its principal object to provide simple and efficient mechanism for rapidly and economically performing the wrapping operation without liability of clogging, stoppage, breakage or disarrangement of the parts on account of normal variations in the sizes of the articles wrapped.

A further object of my invention is to so combine and arrange the parts that the act of wrapping shall be performed while the article is continuously moving toward its point of delivery, thus increasing the capacity of the device by eliminating periods of rest in the progress of the article through the machine.

A further object of my invention is to so form, combine and arrange the principal parts of the wrapping mechanism that all articles will be tightly and uniformly wrapped, notwithstanding inequalities and ordinary variations in size.

A further object of my invention is to provide simple and efficient mechanism for successively supplying from a continuous web of wrapping material separate wrappers suitable to envelop the articles to be wrapped.

Generally stated, the organized apparatus consists of mechanism for feeding separate wrappers across the path of the article to be wrapped; mechanism for delivering the articles one by one from a magazine or other source of supply to a movable article holder or receiver into which the wrapper is forced or carried by the article of merchandise and by which the wrapper is partially wrapped around the article; folding mechanism operatively associated with the article receiver for folding the wrapper completely around the article as it continuously moves toward its point of delivery from the machine; and mechanism for releasing the article from the holder by which it is carried to permit its delivery from the machine.

In the drawings chosen for the purpose of illustrating my invention, the scope whereof is pointed out in the claims.

Like symbols refer to like parts wherever they occur.

I will now proceed to describe my invention more fully, so that others skilled in the art to which it appertains may apply the same.

In the specific embodiment of my invention represented in the drawings, which show a machine designed to apply wrappers to parallelopipedal articles of merchandise, such as caramels, chocolates, soap, and the like, 1 is the bed plate or base of the machine to which is rigidly secured an upwardly extending standard or frame 2 that is provided with a horizontally extending sleeve 3 which forms a bearing for the main shaft 4 from which all the movable parts of the mechanism receive power. While the main shaft 4 may be driven in any desired manner from any suitable source of power, it is preferred to employ an electric motor for the purpose, and to interpose clutch mechanism between said motor and said main shaft in order that the wrapping mechanism may be thrown out of operation at will without stopping the motor. To this end, it is preferred to form the power shaft 5, which may be and preferably is the motor shaft, as a worm which meshes with a worm wheel 6 that is rotatably mounted upon the shaft 4 within the gear casing or housing 7 carried by the bearing sleeve 3. The worm wheel 6 is provided with a rigidly attached friction boss or clutch member 8 that is adapted to be engaged by the inner ends of the clutch levers 9 carried by a clutch collar 10 which is rigidly secured to the main shaft 4. The clutch levers 9, which are pivotally mounted on the oppositely extending clevised arms of the clutch collar by means of pivot pins 11, 11, are provided at their outer ends with adjusting screws 12, 12 which serve to insure the proper frictional engagement of each of the levers 9 with the worm wheel clutch member 8 when said levers are rocked on their pivots by the cone sleeve 13, as will be readily understood. The clutch cone 13, which is both slidably and rotatably mounted upon the main shaft 4, may be conveniently actuated to throw the clutch into and out of operation by means of a clutch actuating lever 14 which is pivoted to a bracket 15 secured to and extending outwardly from the cover plate of the gear casing 7.

Bolted or otherwise suitably secured to the upper portion of the standard 2 is the magazine from which the articles to be wrapped are fed to the wrapping mechanism. This magazine is preferably formed as an inclined chute 16 the upper end of which communicates with a table 17 upon which the articles to be wrapped are received and from which they pass into the said chute. The chute, which substantially conforms in cross-section to the articles to be wrapped, but which is sufficiently large to permit the articles of merchandise to freely drop to a position in front of the feed plunger 19, is preferably provided with a slotted side or opening through which the articles may be observed and any clogging in the chute corrected; and the table 17 is preferably provided with vertically extending marginal flanges which increase the capacity of said table and also prevent the unwrapped articles from being accidentally knocked off.

The lower or delivery end of the feed chute 16 is closed by a reciprocating conveyer 18 which is slidingly connected to a reciprocating feed plunger 19 that is mounted therein. The conveyer, which is preferably a channel member having its open side presented to the articles in the magazine chute 16, is connected to the feed plunger 19 so that said plunger and conveyer may move together, as well as independently. For this purpose the conveyer 18 may be provided with lips or inturned flanges 20 which engage and bear upon the beveled edges 21 of the plunger with sufficient firmness to create such frictional resistance to the sliding of the parts on each other that the movement of the feed plunger 19 in the operation of delivering an unwrapped article to the wrapping devices causes the conveyer 18 to move toward said wrapping devices until the stop or lug 22 formed on the rear end of the conveyer engages a portion of the chute 16. When the conveyer is thus arrested by coming in contact with the base of the magazine, the continued movement of the feed plunger 19 toward the wrapping devices pushes the article to be wrapped out of the open end of the conveyer 18 and thus delivers it to the wrapping devices. As soon as the article of merchandise has been delivered to the wrapping devices, the plunger 19 retreats and carries the conveyer backwardly with it until the stop 23 on the forward end of said conveyer engages a portion of the chute 16, whereupon the further movement of the conveyer in this direction is arrested and the feed plunger slides within said conveyer until it is withdrawn from beneath the articles in the magazine chute 16, thus permitting another unwrapped article to descend into the conveyer in front of the feed plunger.

The special means which I prefer to employ for actuating the conveyer 18 and plunger 19 consist of an arm or lever 24 which is pivotally connected to the frame of the machine at 25 and which is provided with a cam roll 26 that coöperates with a cam 27 which is rigidly secured to the main shaft 4. In order to insure the entrance of the cam roll 26 into the cam track 28 with which the face of the cam 27 is provided, the pivoted actuating arm 24 is connected to the standard 2 of the machine frame by means of a spring 29. With such an actuating mechanism, the conveyer 18 and feed plunger 19 are formed on circular arcs the center of curvature of which is the pivotal point of the actuating arm or lever 24.

Figure 25:
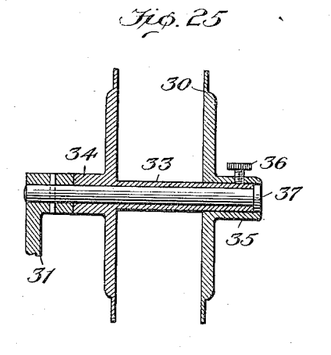
Fig. 25 is a detail axial cross-section of the reel from which the web of wrapping material is supplied.
Figure 26:
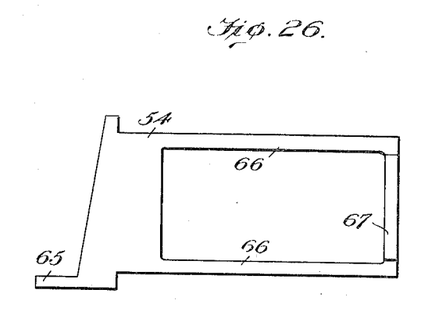
Fig. 26 is a detail plan view of the reciprocating knife for severing the web of wrapping material.
Figure 27:
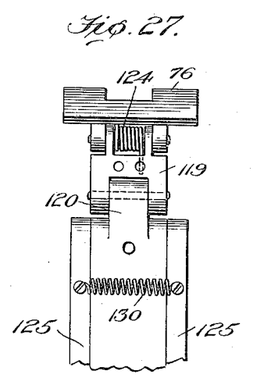
Fig. 27 is a detail elevation of the flexible joint of the wrapper folder plate, the stop bar which limits the rotation of said plate being omitted.
Figure 28:
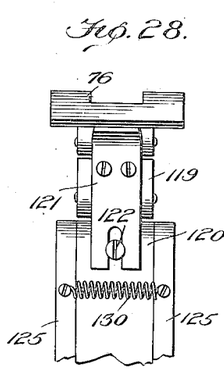
Fig. 28 is a detail elevation of the flexible joint of the wrapper folder plate.
Figure 29:
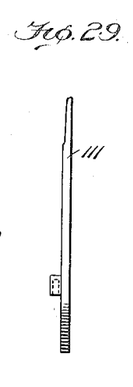
Fig. 29 is a detail elevation of one of the folding fingers mounted upon the rotating carrier head.
Figure 30:
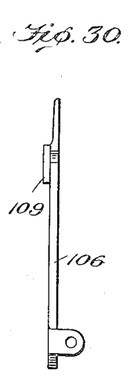
Fig. 30 is a detail elevation of another of the folding fingers mounted upon the rotating carrier head.
Figure 31:
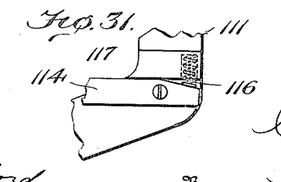
Fig. 31 is a detail elevation of a portion of one of the folding fingers, showing the manner of mounting the spring pressed latch bar thereon.

The reel 30 upon which the web of paper or other wrapping material is spooled is preferably mounted upon an arm or bracket 31 which is adjustably connected to the standard 2 of the machine by means of a cap-screw 32. In order that the roll of wrapping material may unwind freely at all times and may be readily renewed, the reel 30 is preferably formed with a tubular journal 33 upon the inner end of which a flanged collar 34 is rigidly mounted and upon the outer end of which a substantially similar flanged collar 35 is detachably secured by means of a set screw 36. As shown in Fig. 25, the reel thus formed is secured to the bracket arm 31 by means of a horizontally extending pin or axle 37 which passes through the tubular journal 33 and is rigidly secured to said bracket. The pin 37 is formed at its outer end with a head which engages the adjacent end of the tubular journal 33 within the bore of the flanged collar 35, thus maintaining the reel 30 in place. When it is desired to insert a new roll of wrapping paper upon the supply reel, it is only necessary to loosen the set screw 36, slide the flanged collar 35 off the tubular journal 33, insert the roll of paper, replace the flanged collar 35 and tighten the set screw 36, as will be readily understood.

Between the supply reel 30 and the wrapper feed rolls 38, 38 is interposed a suitable tension device which insures the proper feeding of the web of wrapping material 39 and prevents it from wrinkling or sagging. The wrapper tension device which I prefer to employ, and which has proven highly efficient in practice, consists of a very smooth or polished arc shaped plate 40 having longitudinally extending vertical guide flanges 41, 41 which are spaced apart a slightly greater distance than the width of the web of wrapping material employed, thus insuring the free passage of the wrapper over the surface of the plate between the said guide flanges. The vertical guide flanges 41 preferably project somewhat beyond the point where the web of wrapping material leaves the edge of the curved tension plate 40, as illustrated more particularly in Fig. 3, while between said guide flanges at the opposite end of the tension plate a guide roller 42 is rotatably mounted on a pivot pin 43, said guide roller being arranged closely adjacent to the upper surface of the tension plate 40 so as to lead the web of wrapping material into contact therewith. It is also preferred to employ a tension weight 44 in conjunction with the curved tension plate 40. This tension weight 44, which is preferably the full width of the web of wrapping material, may be conveniently maintained in proper relation with the curved tension plate 40 by pivotally mounting it upon a pin 45 extending between the vertical guide flanges of the tension plate. The lower free edge of the tension weight 44, by bearing upon the web of wrapping material as it passes over the surface of the tension plate, insures the desired smooth surface of the wrapping paper and assists in maintaining a uniform tension thereon as it passes to the feed rollers 38.

The several tension devices heretofore described are connected with the standard 2 of the machine frame by means of a bracket 46, said bracket being provided with an adjusting slot for the passage of a cap-screw 47. By this means the tension devices may be adjusted longitudinally of the feed rolls 38, thus insuring a central and uniform feed of the web of wrapping material to the said feed rolls.

In order that the tension upon the web of wrapping material as it passes between the feed rollers 38 may not be subject to variations due to the constantly changing quantity of wrapping material spooled on the supply reel 30, and in order to eliminate any slippage of the wrapping material in feeding between said rollers, it is preferred to interpose auxiliary web feeding mechanism between the supply reel 30 and the tension devices. Such auxiliary web feeding mechanism, which is operative to cause the wrapping material to be supplied to the tension devices and feed rollers 38 at the necessary rate, may be formed as an arm or lever 48 which is pivotally mounted upon the standard 2 of the machine frame by means of a pivot pin or screw 49, the upper end of the arm or lever being provided with a transversely extending rod or member 50 which is of sufficient length to pass entirely under the web of wrapping material. The lever 48 is so arranged that the cam roll 51 which is mounted thereon is maintained by gravity in contact with the rotating cam 27 by which these parts are actuated, said cam roll being of sufficient width to insure its travel upon the outer edge of said cam. Each revolution of the cam 27 causes the pivoted arm 48 to be rocked toward the tension devices, thus withdrawing the web of paper from the reel 30, as will be readily understood. By increasing or decreasing the length of the lever 48, the amount of wrapper withdrawn from the supply reel 30 at each revolution of the cam 27 may be varied without changing the form of the cam.

The feed rollers 38 by which the web of wrapping material is fed to the cutting mechanism and to the wrapping devices are journaled in a frame 52 upon the under side of which the fixed knife 53 and the movable knife 54 are mounted. One of the rollers 38 is journaled in the frame with capability of movement toward its companion, springs 55, which are seated in the frame and bear upon the journals of the adjustable roller, serving to maintain such pressure of one roller upon the other as will prevent slippage of the web of wrapping material as it is drawn between them. As the springs 55 press the wrapper feed rollers together, it is only necessary to drive one of said rollers positively. For this purpose it is preferred to rigidly secure to the end of one of the feed rollers 38 a ratchet wheel 56 that is intermittently driven by means of a reciprocating rack bar 57 which is pivotally mounted at 58 upon the cam actuated arm or lever 24 by which the movable knife 54, the conveyer 18 and the feed plunger 19 are operated. The ratchet wheel 56 is engaged by a spring pressed pawl 59 which is pivotally mounted upon the feed roller frame 52, the arrangement being such that the ratchet wheel and attached feed roller are permitted to revolve in but one direction and then only upon the retreat of the movable knife and feed plunger after their respective functions of severing the web of wrapping material and delivering the article to be wrapped to the wrapping devices have been performed. Any suitable means may be employed for so supporting the rack bar that it may yield sufficiently to permit the teeth thereof to pass over the teeth of the ratchet wheel 56 when the latter is prevented from rotating by the pawl 59, such means, however, preferably consisting, as shown, of a tension spring 60 which is attached at one end to the actuating lever 24 and at the other end to that arm of the pivoted rack bar 57 which is upon the opposite side of the pivot pin 58 from the toothed portion of said bar. The frame 52 with its attached parts may be conveniently mounted upon the standard 2 of the machine frame by means of bolts 61.

It will be noted that the extent of rotation of the feed rollers 38 is governed by the number of teeth in the reciprocating rack 57, and, therefore, that the amount of wrapping material necessary to form a wrapper for an article of any particular size may be regulated by increasing or decreasing the number of such teeth.

As heretofore described, the cutter mechanism for severing the web of wrapping material into separate wrappers preferably consists of a fixed blade 53 and a reciprocating blade 54 which are mounted upon the frame 52 beneath the wrapper feed rollers 38 journaled therein. The cutting edge of the fixed knife 53 is arranged parallel to but slightly out of vertical alinement with the line of contact of the feed rollers 38, thus permitting the web of wrapping material to freely pass from the feed rollers directly in front of said knife, while the opposite edge of the knife 53 bears against a vertically extending shoulder 62 that is formed on the frame 52 for the purpose of preventing the fixed knife from moving backwardly during a cutting operation. In order to insure keen cutting blades and to obtain the desired shearing effect, as well as for the purpose of preventing the web of wrapping material from being drawn in between the two blades without being cut, the stationary knife 53 is pressed upwardly against the reciprocating knife 54 by means of light springs 63 which encircle and are supported by screws or headed pins 64 that pass through apertures in the fixed knife and enter and are affixed to the supporting frame 52.

The reciprocating blade 54, which is preferably arranged to slide over the upper surface of the fixed blade 53 of the web severing device, is formed with a cutting edge which is angularly disposed with respect to the cutting edge of the complemental blade, thus insuring efficient shearing of the wrapping material. The cutting end of the reciprocating blade is provided at one side with an extension 65 which is sufficiently long to remain in contact with the fixed knife 53 when the movable blade is retracted to permit the passage of the web of wrapping material. By this means the proper entrance of the reciprocating knife 54 between the fixed knife 53 and the under side of the supporting frame 52 is assured, and all liability of the cutting edges of the blades injuring each other is eliminated.

Figure 1:
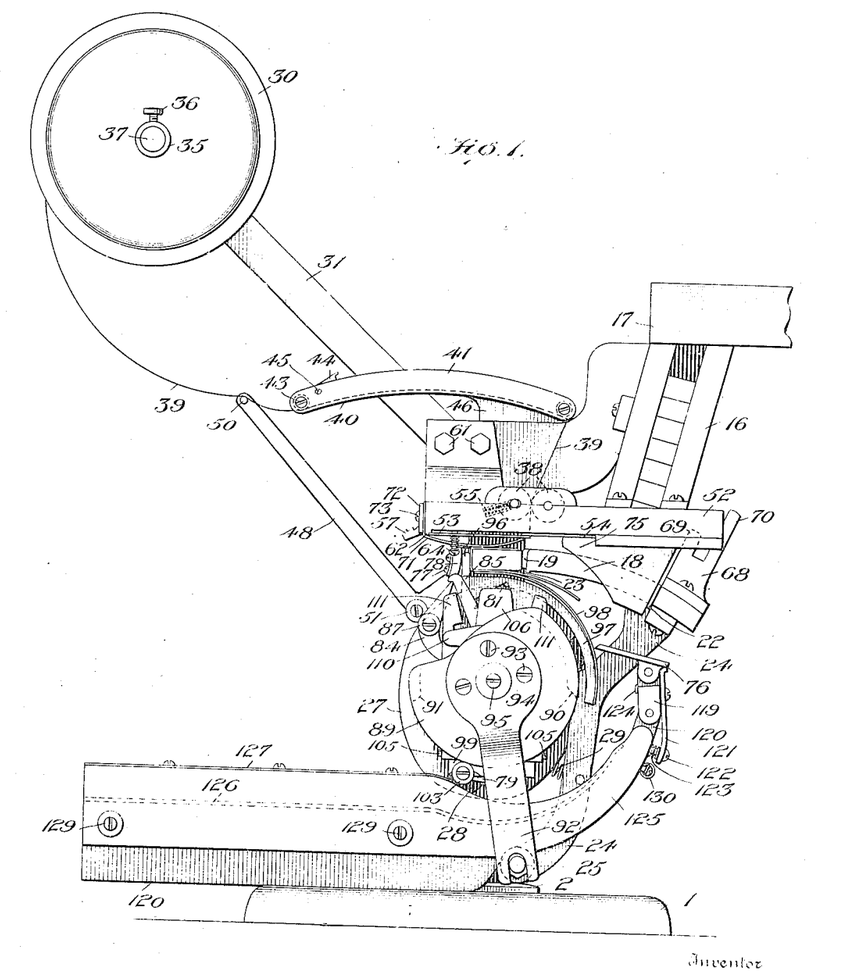
Figure 1 is a side elevation of a wrapping machine embodying my invention.
Figure 2:
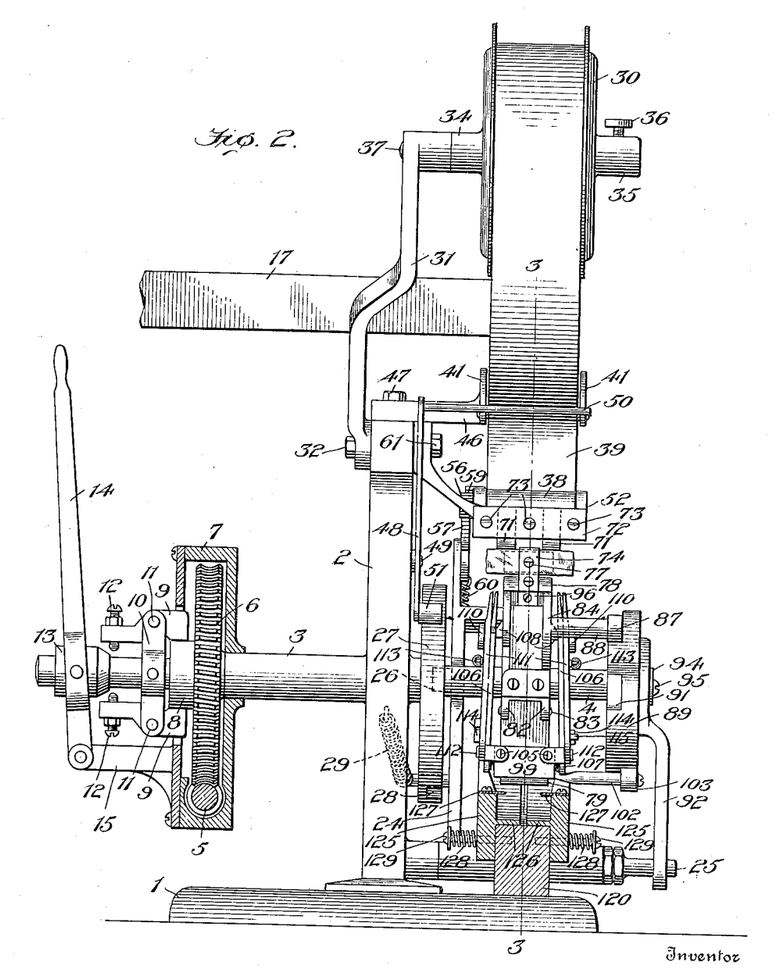
Fig. 2 is a view in elevation showing the delivery side of the machine, the driving gear casing and the wrapper folding guides forming the delivery chute being shown in section.
Figure 3:
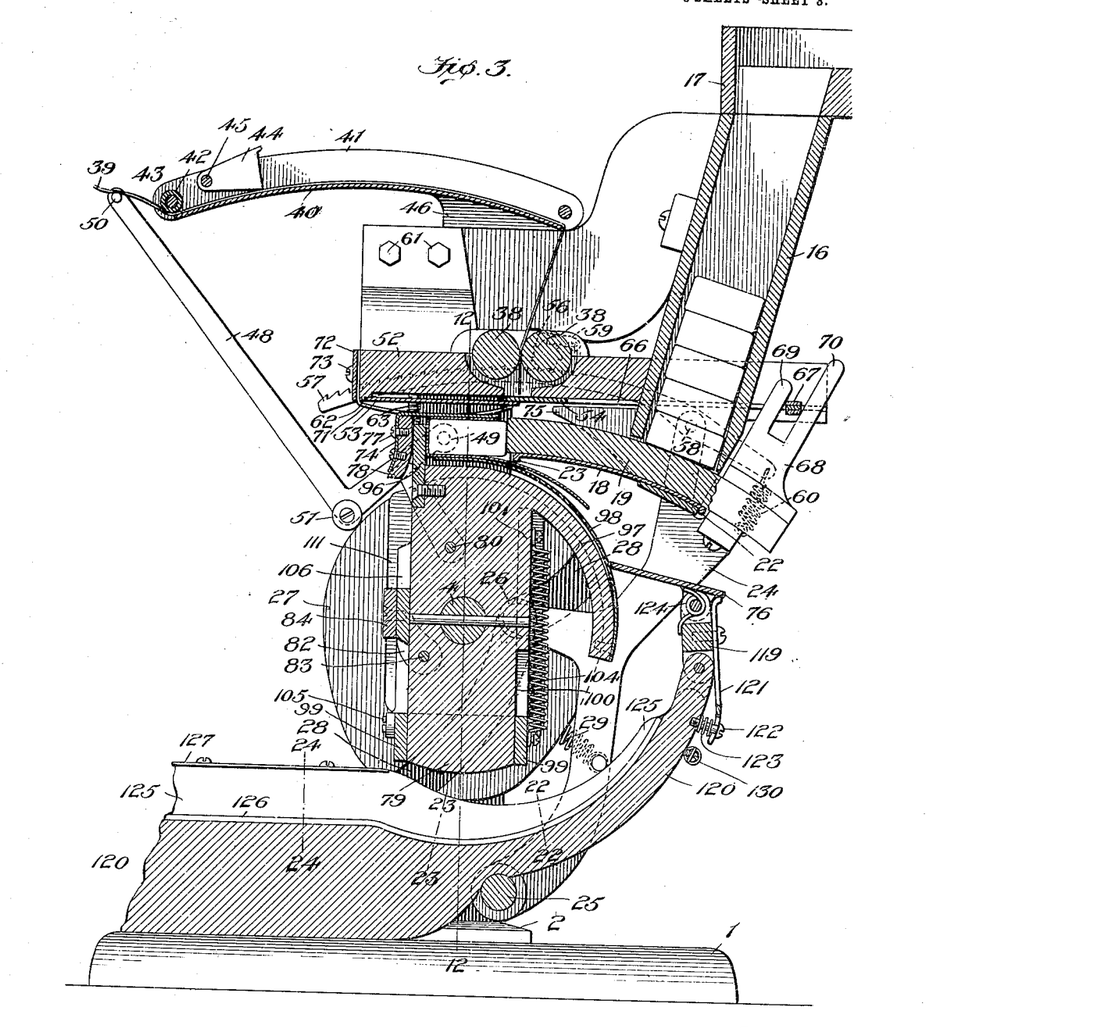
Fig. 3 is an enlarged, vertical, central section of the machine, the wrapper supply reel and its supporting standard being omitted, and a portion of the feed plunger and knife actuating mechanism being shown in elevation.
Figure 4:
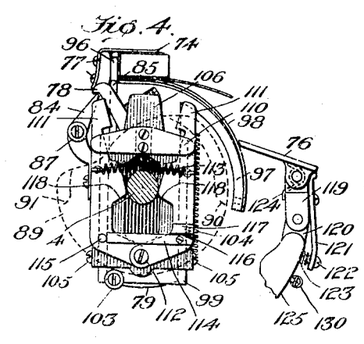
Figs. 4, 5, 6, 7, 8 and 9 are detail views respectively, showing the relative positions successively assumed by the several folding devices during the wrapper folding operation.
Figure 5:
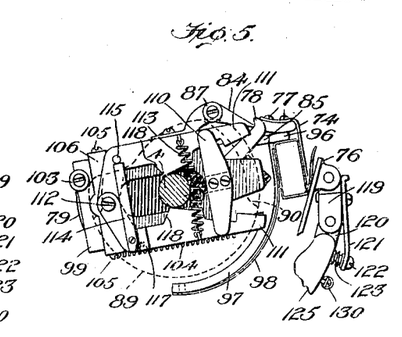
Figure 17:
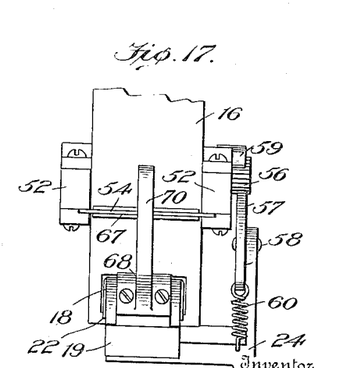
Fig. 17 is a detail view showing in end elevation the devices illustrated in Fig. 14.
Figure 19:
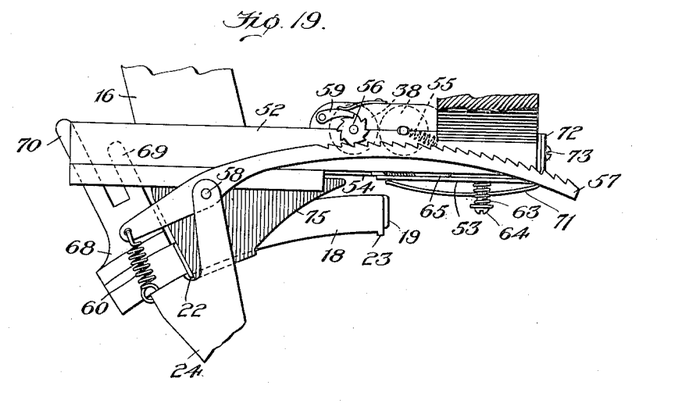
Fig. 19 is a detail view showing the relation of the wrapper feed rollers, the wrapper cutting devices and the plunger and conveyer to their actuating mechanisms.
Figure 20:
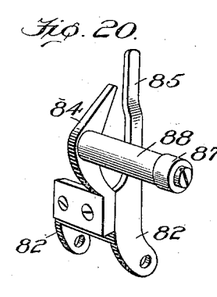
Fig. 20 is a detail perspective view of the cam actuated latch for locking the article holder against movement on the carrier head.
Figure 21:
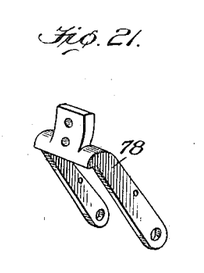
Fig. 21 is a detail perspective view of the yoke portion of the article holder which is mounted on the carrier head.
Figure 22:
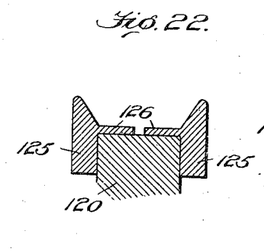
Figs. 22, 23 and 24 are detail sections taken, respectively, on the planes of the lines 22—22, 23—23, and 24—24, Fig. 3, showing the spring pressed folder blades constituting the delivery chute for the wrapped articles.
Figure 23:
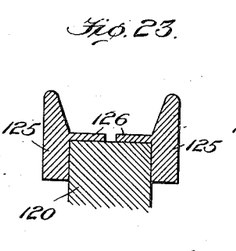

As it is preferred to actuate the reciprocating knife 54 through the instrumentality of the pivoted arm 24 by which the article feeding devices and the wrapper feed rollers are actuated, the rear end of the knife is slotted or cut away to form a hollow rectangle through which the magazine chute 16 passes, the slot being sufficiently long to permit the knife to have the desired longitudinal reciprocation without interference from said chute. The side bars 66 of the reciprocating knife are received by and guided in guide grooves formed in the frame 52, while the transversely extending end bar 67, which may be reinforced as shown in Figs. 3 and 17, is adapted to be engaged by the knife actuating member 68 mounted upon the upper end of the cam actuated arm 24. The knife actuating member 68 is preferably of such character that the reciprocating knife 54 is actuated during a portion only of the travel of the pivoted arm 24, an unnecessarily extended separation of the knives being thereby avoided and a compact arrangement of parts resulting. The form of the member 68 illustrated in the drawings is well adapted to actuate the reciprocating knife in this manner. As shown, the member 68 is provided with an open ended slot which is adapted to receive the transversely extending bar 67 of the reciprocating knife 54. This slot is formed by two upwardly extending, parallel arms or fingers of unequal length, the finger 69, which operates to withdraw the knife 54 after the web of wrapping material has been severed, being shorter than the finger 70 which serves to force the reciprocating knife toward the stationary one. As will be readily understood, when the cam actuated arm 24 to which the knife actuating member 68 is secured is moving away from the magazine chute 16 after an unwrapped article has been delivered to the wrapping devices, the shorter finger 69 of the member 68 will remain in contact with the cross-bar 67 of the knife 54 until, on account of the divergent directions in which the knife 54 and member 68 are compelled to travel, the said finger 69 passes beneath the cross-bar 67, when the knife 54 comes to rest. During the remainder of the movement of the knife actuating member 68 away from the magazine chute 16, therefore, the knife 54 remains at rest. Upon the movement of the member 68 toward the magazine chute, the knife 54 remains at rest until the longer finger 70 of the said member 68 engages the cross-bar 67 of the knife, whereupon the knife is forced forward to sever the web of wrapping material. By increasing or decreasing the length of the shorter knife actuating finger 69 the extent of reciprocation of the movable knife 54 may be readily controlled.

In addition to the hereinbefore described devices which are associated with the supporting frame 52, said frame is also preferably provided with a plurality of horizontally spaced flexible guides 71 beneath which the article to be wrapped is forced by the feed plunger 19 in its operation of delivering the article of merchandise to the wrapping devices. These flexible guides 71, which may be conveniently secured to the end of the frame 52 by means of a plate 72 and screws 73, are preferably in the form of leaf springs which are bowed or curved downwardly from the under surface of the fixed knife 53 so as to insure the proper entrance of the article and its wrapper into the article holder 74 mounted upon the revolving carrier head, the free ends of the leaf springs being preferably in contact with the under surface of the said knife at points adjacent to the cutting edge thereof, to thereby eliminate any possibility of the incoming wrapper catching upon the ends of said guides. To certainly prevent the incoming web of wrapping material from catching upon the bottom of the magazine chute 16, shields or guides 75 may be, and preferably are, also provided. These shields or guides, which are arranged vertically in parallel relation upon either side of the opening in the chute through which the conveyer 18 and feed plunger 19 operate, extend forwardly from the lower end of said chute upon which they are mounted toward the fixed knife 53, and terminates at a sufficient distance from the cutting edge thereof to permit the free passage of the wrapper. The lower edges of the shields 75 are curved or cut away to avoid coming in contact with the wrapper when the article with the said wrapper partly folded around it is being carried toward the pivoted folder member or plate 76 by the article holder 74.

The article holder 74, which is preferably a thin, flat, resilient plate that is adapted to pass between the leaf spring article guides 71 carried by the frame 52, is rigidly attached, as by screws 77, to a locking yoke 78 which is pivotally connected to the rotating carrier head 79 by means of a pivot pin 80. In order to insure strength and compactness of construction and accuracy of movement in operation, the locking yoke 78, as shown more particularly in Figs. 2, 10, 13 and 21, is preferably formed with two parallel arms which receive the carrier head 79 between them, the carrier head adjacent to said arms being depressed or countersunk so that the outer surface of each of said arms is flush with the corresponding outer surface of the said member 79. The article holder or receiver 74, which is thus pivotally mounted upon the carrier head, is preferably arranged so that it constantly tends to assume a position in which it is adapted to receive and hold the article to be wrapped, springs 81, which are located in slots in the carrier head 79 and are attached to said head and to the locking yoke 78, being employed for this purpose.

Figure 10:
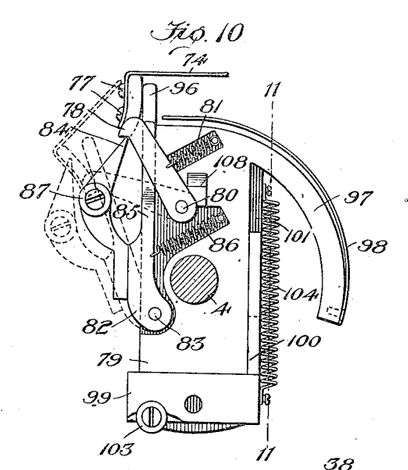
Fig. 10 is a detail view of the carrier head showing the relation of the article holder and the article holder locking and controlling device thereto, and also showing the yieldingly supported yoke or frame by which certain folding devices are slidingly mounted upon said head.
Figure 11:
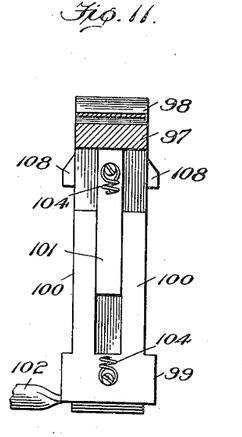
Fig. 11 is a vertical section taken in the plane of the line 11—11, Fig. 10, the cam roll finger on the sliding yoke being omitted, and a portion of the spring by which the yoke is connected to the carrier head being broken away.

In order to lock the article holder 74 and yoke 78 against pivotal movement on the carrier head 79, as well as for the purpose of withdrawing said holder from engagement with the article at the proper time in the course of the wrapping operations, an article holder locking and controlling device is employed. This locking and controlling device is preferably formed with two connected, parallel arms 82 which receive the rotating carrier head 79 between them and which are perforated to receive the pivot pin 83 by which the device is movably mounted upon said head. Secured to the pivot arms 82, and extending upwardly therefrom so as not to interfere with the pivotal movement of the article holder 74, is a locking finger or member 84 the upper end of which, as shown in Fig. 10, is adapted to stand under the shoulder at the upper end of the locking yoke 78 and thus lock the article holder 74 against pivotal movement on the carrier head. Also extending upwardly from the pivot arms 82 and preferably formed as an integral extension of one of them, is an arm 85 which operates to rotate the article holder 74 upon the carrier head 79. This article holder actuating member 85 is preferably offset near its upper end so that it may pass between and apply power intermediate of the pivot arms of the yoke 78. As shown more particularly in Fig. 10, when the article holder 74 is in locked position, its locking and controlling device is capable of sufficient independent pivotal movement on the pin 83 to allow the locking finger 84 to be withdrawn from beneath the locking shoulder of the yoke 78 before the article holder actuating arm 85 engages and rotates said yoke and the attached article holder. The locking and controlling device is normally maintained in locked position by means of springs 86 which are respectively connected to the rotating carrier head 79 and to the adjacent pivot arm 82 of said locking and controlling device, the said springs being preferably located in depressions or recesses formed on opposite sides of the carrier head.

As it is desirable that the operation of the article holder 74, when being withdrawn from holding engagement with the article, shall be positive, it is preferred to actuate the locking and controlling device through the instrumentality of a cam roll 87 which is journaled upon a pin 88 that is rigidly connected to the locking finger 84 and extends horizontally therefrom toward the stationary cam 89 which is loosely mounted upon the main shaft 4, the said pin 88 being of proper length to permit the cam roll to follow the inner cam track of said cam. As will be readily understood by reference to Figs. 4 to 9, inclusive, of the drawings, during the revolution of the carrier head 79 the springs 86 maintain the article holder locking and controlling device in locked position until the cam roll 87 thereof reaches the point 90 on the inner cam track of the stationary cam 89, when the locking finger 84 is withdrawn from beneath the shoulder on the locking yoke 78 and the said yoke and attached article holder 74 are rotated upon the pivot pin 80 by the actuating arm 85, thus releasing the article of merchandise from the holder. The article holder, locking yoke, and the locking and controlling devices for the article holder remain in this released or unlocked position until, by the continued rotation of the carrier head, the cam roll 87 is opposite the depression 91 in the cam 89, when the springs 81 and 86 return the several parts to their normal or locked positions.

The cam 89, which is mounted upon the main shaft 4, is maintained in a stationary or fixed position by means which preferably consist of an arm 92, the bifurcated end of which embraces the stud 25 carried by the machine frame and the opposite disk-like end of which is rigidly secured to the said cam by screws 93. The cam 89 and its holding member 92 may be maintained on the main shaft 4 by means of a washer 94 and a screw 95 which passes through said washer and has threaded engagement with said shaft.

Rigidly mounted upon the carrier head 79 and passing between the pivot arms of the locking yoke 78 so as not to interfere with the opening or unlocking movement of the article holder 74 is an article ejector 96 which forms a stop for the article to be wrapped when the latter is delivered to the article holder by the conveyer 18 and feed plunger 19. This ejector, as will be readily understood upon reference to Figs. 8 and 9 of the drawings, serves to force the article into the delivery chute when said article is freed from the holder 74.

Secured to and preferably formed integral with the carrier head 79 is a wrapper support and guide 97 which is arranged to coact with the wrapper folding plate 76. This wrapper support and guide, the outer surface of which is preferably formed as the segment of a circular cylinder whose axis coincides with the axis of the main shaft 4, extends in the direction of rotation of the carrier head sufficiently far beyond the article ejector 96 to insure the portion of the wrapper which is operated upon by the wrapper folding plate 76 being received upon the top of said plate. Preferably, however, the form and arrangement of the parts is such that the leading end of the wrapper support and guide member 97 has advanced beyond the inner end of the folding plate 76 before the article to be wrapped is delivered to the article holder 74.

In order the more certainly to insure the delivery of the free end of the wrapper upon the upper surface of the folding plate 76, as well as to permit articles which vary somewhat in size to be received by and firmly held in the article holder 74, the wrapper support and guide 97 is preferably provided with a flexible facing or spring tongue 98 which is secured to the leading end of the said member 97 and extends from thence toward the ejector 96 adjacent to which it terminates. From its point of attachment to its free end, the spring tongue 98 gradually diverges from the outer curved face of the wrapper support and guide 97, thus permitting the desired spring action or adjustability of the facing.

Slidingly mounted upon the carrier head 79, so as to be movable toward and from the article to be wrapped, is a folder supporting member or frame 99 to which certain of the devices that operate to make the end folds of the wrapper are movably connected. This supporting frame, which preferably completely embraces and closely fits the carrier head 79, and which in the present instance is shown as rectangular, is preferably provided with parallel guide bars 100 which extend upon either side and in sliding contact with a mating guide rib or member 101 formed upon the carrier head. The guiding means thus provided prevent the movable frame 99 from binding upon the carrier 79 when sliding thereon. The frame 99 is preferably actuated through the instrumentality of a cam finger 102 which is rigidly connected to said frame and upon which is journaled a cam roll 103 that coöperates with the outer cam face of the stationary cam 89. A spring 104, which is attached to the frame 99 and to the carrier head 79, serves to maintain the cam roll 103 in contact with the face of the cam 89 and to constantly tend to move said frame toward the article holder 74, as will be readily understood upon reference to Figs. 3, 10 and 13 of the drawings.

Figure 12:
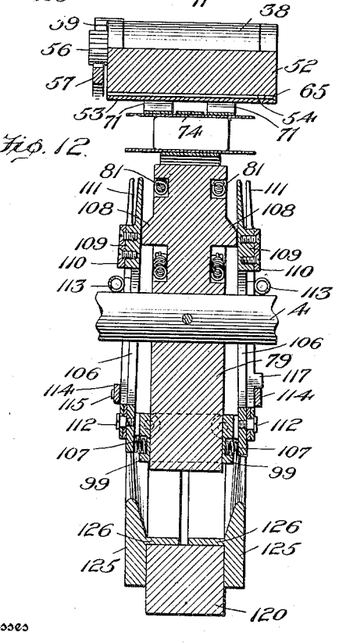
Fig. 12 is a detail vertical section, taken in the plane of the line 12—12, Fig. 3, showing the carrier head and attached folding devices, together with portions of the wrapper feeding mechanism and the spring pressed blades constituting the delivery chute for the wrapped articles, the parts being in the positions they occupy at the beginning of the wrapping operation.
Figure 13:
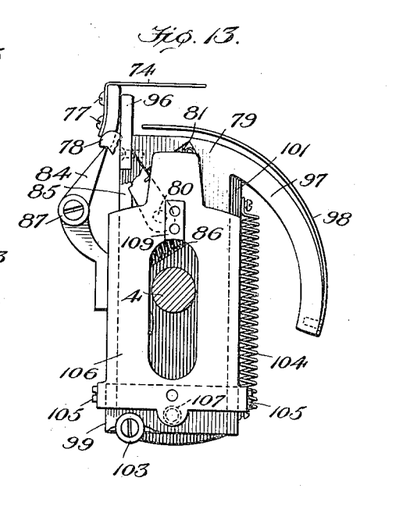
Fig. 13 is a detail view of the carrier head showing a portion of the folding mechanism mounted thereon.
Figure 14:
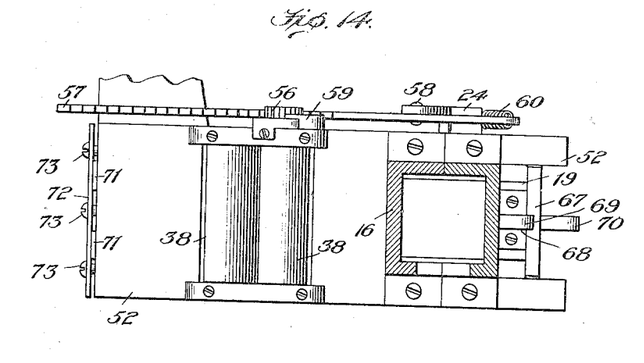
Fig. 14 is a detail plan view of the wrapper feed rolls and the mechanism by which said rolls and the wrapper cutting device are actuated.
Figure 15:
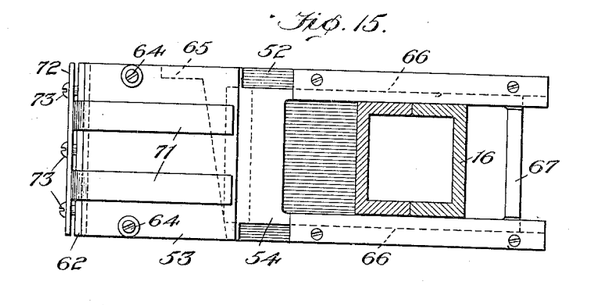
Fig. 15 is a detail inverted plan view of the wrapper cutting mechanism, its guiding and supporting frame, and the flexible article guides mounted upon said frame.
Figures 16, 18:
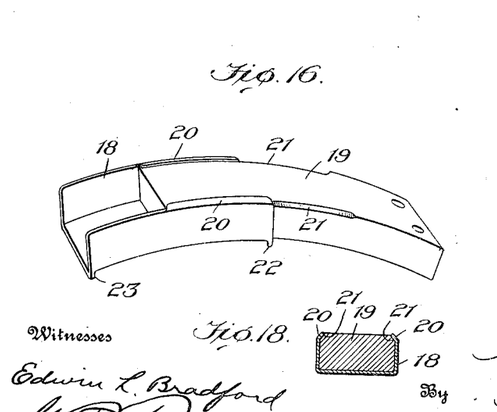
Fig. 16 is a detail perspective view of the plunger and conveyer by which the articles to be wrapped are transferred from the magazine or source of supply to the article holder mounted upon the carrier head.
Fig. 18 is a transverse vertical section of the plunger and conveyer illustrated in Fig. 16, showing their mode of connection.

Pivotally mounted upon the folder supporting frame 99, as by means of pivot screws 105, are two primary folding members or fingers 106 which function as means for making the initial end folds in the wrapper. These fingers 106, which are arranged upon opposite sides of the carrier head 79, are longitudinally slotted to permit the passage of the main shaft 4 without interfering with the sliding movements of said fingers with respect to said carrier head. The ends of the folding fingers 106 which are adjacent to the article holder 74 are preferably formed as thin blades or tongues which narrow in width toward their ends, such a construction insuring the proper form of the first end fold of the wrapper and permitting the subsequently operating, or secondary folding fingers 111 to perform their functions while the initial end fold of the wrapper is maintained in place by the initially operating fingers 106. As shown more particularly in Fig. 12, the wrapper engaging ends of the folding fingers 106 are pressed or forced toward each other by means of springs 107 which are seated in the sliding rectangular frame 99 and bear upon their respective folding fingers. In order to insure that the ends of the folding members 106 shall not strike against the article being wrapped as they are advanced toward it, the carrier head 79 is provided with oppositely disposed lugs 108 which maintain the wrapper engaging ends of the said folding fingers in proper spaced relation to receive between them articles which may be of somewhat larger size than normal. These lugs, which are adapted to enter the longitudinally extending slots in the folding fingers 106 when said fingers are moved a sufficient distance toward the article holder 74, are preferably so located that the wrapper engaging ends of the fingers have passed partly, say half way, over the ends of the article being wrapped before they are permitted to move toward each other to adjust themselves to the article. The surfaces of the lugs 108 are beveled to permit the folding fingers 106 to be retracted.

Each folding finger 106 is provided near its upper end with a centrally located projecting lug 109 to which is rigidly secured, as by means of screws, a transversely extending plate or guide member 110. Operating between each of the folding fingers 106 and its attached guide plate 110 are two pivotally mounted secondary folding fingers 111 which are movable toward each other to fold the ends of the wrapper over the folds formed by the initially operating folding fingers 106. To simplify the construction, the folding fingers 111 of each pair are preferably pivotally connected to their adjacent fingers 106 at common pivotal points, pivot screws 112, which have threaded engagement with the pivoted ends of the said fingers 106, being employed for the purpose. The secondary folding fingers 111 of each pair are respectively connected by springs 113 which constantly tend to cause the wrapper engaging ends of the fingers to move toward each other, said fingers 111 being suitably recessed to permit them to close around the guide plate lug 109. In order to maintain the secondary folding fingers in an open or inoperative position until after they have been properly advanced opposite the ends of the article being wrapped, it is preferred to pivotally mount upon one of the fingers 111 of each pair a bar or latch 114 which is adapted to engage a pin or stop 115 carried by the other finger of each pair to thus prevent the springs 113 from causing the said secondary folding fingers to close. The latches 114, after being disengaged from their locking abutments or pins 115 by the main shaft 4, as will hereinafter more fully appear, are returned to locking engagement with said pins by means of springs 116, which are seated on the folding fingers to which the said latches are respectively pivoted, lugs or stops 117, which are formed on the folding fingers 111, serving to prevent said latches from rotating past their pins 115, as will be readily understood.

As shown more particularly in Figs. 4 to 9, inclusive, of the drawings, the inner faces of the folding fingers 111 are formed with inclined faces 118 which, by engagement with the main shaft 4, cause the wrapper engaging ends of the said fingers to separate when the frame 99 upon which these folding devices are mounted moves away from the article holder 74. As shown, these inclined faces 118 are preferably so located that the wrapper engaging ends of the secondary folding fingers 111 do not begin to separate until after said fingers have executed a portion of their movement of withdrawal from engagement with the partially wrapped article. By this means the end folds of the wrapper which are made by the secondary folding fingers are very perfectly formed, and are tightly pressed against the initial end folds formed by the primary folding fingers 106.

The wrapper folding plate 76, which is preferably slightly wider than the web of wrapping material and which operates to complete the folding of the wrapper around the sides of the article of merchandise, is flexibly mounted upon a suitable stationary part of the machine, preferably by means of a clevised link 119 which is pivotally attached to said plate and to the upper end of the supporting member 120 upon which the parallel blades forming the delivery chute are mounted. Rigidly secured to the transverse bar of the clevised link member 119 is a plate 121 the upper end of which forms a stop limiting the pivotal movement of the folder plate 76, and the lower end of which is slotted to receive a screw 122 that has threaded engagement with the supporting member 120. By means of a spring 123, which is interposed between and bears upon the member 120 and plate 121, the clevised link 119 is yieldingly maintained in position and may be adjusted to properly position the folder plate 76 with respect to the rotating carrier head 79. The spring 124, which encircles the pivot pin connecting the folder plate 76 to the link 119, is arranged with one of its ends in contact with the under side of the plate 76 and with its other end in engagement with a portion of the link 119, the folder plate being thus yieldingly supported in such manner that it constantly tends to rotate to the uppermost position which the stop plate or bar 121 will permit it to assume. When the folder plate is in its uppermost position, the free edge thereof opposite its pivot is adapted to have sliding contact with the outer surface of the flexible facing or spring tongue 98 until the leading side of the article being wrapped causes said plate 76 to turn on its flexible joint and permit the article to pass. During the movement of the article of merchandise past the folder plate 76, the latter adjusts itself to the surface of the article and completes the folding of the wrapper around the sides thereof, as will be readily understood upon reference to Figs. 4 to 7, inclusive, of the drawings. When the article of merchandise and its holder 74 have been carried past the folder plate 76, the springs 123 and 124 return said plate to its uppermost or normal position.

Figure 24:
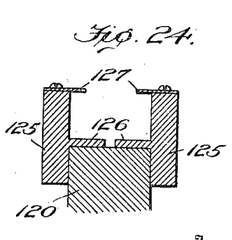

For the purpose of forming the final end folds of the wrapper, it is preferred to employ parallel folding blades 125 between which the article of merchandise is compelled to travel after it has been released from the article holder 74 and is being carried or driven forward by the ejector member 96 of the carrier head 79. These parallel folding members 125, which, as shown, may be of sufficient length to constitute a delivery chute for the wrapped articles, are so arranged with relation to the wrapper folding plate 76 and the cam 89 by which the folding fingers 106 and 111 are operated as to receive the article between them after the wrapper has been operated upon by said plate and folding fingers. In order to insure the proper entry of the article between the blades 125, as well as for the purpose of efficiently forming the final end folds of the wrapper, the entrance ends of said blades are provided with inclined faces which form a splay mouthed channel the sides of which gradually assume a parallel position in which they are adapted to have extended contact with the ends of the wrapped article. The bottom of the channel constituted by the two folder blades is preferably formed by oppositely extending flanges 126, each blade being provided with one such flange. The portions of said bottom forming flanges 126 which are adjacent to the revolving carrier by which the article is transported are circularly curved to form a support for the article after it has been released from the article holder 74 of the carrier, and the inclined portions of said blades forming the sides of the channel adjacent to said curved bottom preferably decrease in height toward the entrance end of said channel. As shown more particularly in Fig. 24, the upper faces of the folder blades 125 may, if desired, be provided with inwardly projecting flexible strips 127 which extend from the delivery ends of said blades forwardly throughout the portion of the channel which is of uniform depth, the completely wrapped articles being thus certainly retained in the chute until they pass out at the delivery end. In order that the folder blades may be permitted to automatically adjust themselves to articles which vary in size from the normal, as well as for the purpose of allowing the blades to be firmly pressed against the end folds of the wrapped article, said blades 125 are preferably mounted upon a stationary supporting member 120 so as to be movable toward and from each other, a convenient arrangement being to interpose said supporting member between said blades so that the bottom forming flanges 126 of the latter rest upon the top of the supporting member. The delivery portions of the folder blades are yieldingly supported and pressed toward each other by means of springs 128 which bear upon the blades and upon washers that are carried by screws 129 which pass through the said blades and have threaded engagement with the supporting member 120, while the entrance ends of said folder blades are preferably similarly pressed or drawn together by means of a connecting spring 130.

The construction of the wrapping machine being substantially such as hereinbefore pointed out, its operation will be as follows. Assuming that the proper length of wrapping material to form a wrapper has been fed through and depends from the feed rollers 38, and that the magazine chute 16 has been supplied with the articles to be wrapped, the clutch actuating lever 15 is moved to the proper position to cause the main shaft 4 to be driven by the power shaft 5 through the instrumentality of the interposed clutch mechanism. As the rotating carrier head 79 moves the attached article holder 74 past the flexible article guides 71 attached to the under side of the frame 52 in which the feed rollers are journaled, the cam roll 26 of the feed plunger actuating lever 24 moves to the position in the cam track 28 illustrated in Fig. 3, thus causing the conveyer 18 and feed plunger 19 to deliver an unwrapped article to the article holder 74, as heretofore described. In pushing the unwrapped article beneath the flexible guides 71 and into the holder 74, the wrapper, which depends across the path of travel of the article, is formed or folded around the top, bottom and rear side of the article, as will be readily understood. As the conveyer and plunger complete the operation of delivering the article to the rotating carrier or article transporting means, the knife actuating finger bracket 68 carried by the plunger controlling arm 24 engages the cross-bar 67 of the movable knife 54 and causes the latter to co-act with the fixed knife 53 to sever the web of wrapping material. The cam track 28 in the cam 27 is so designed that, following the delivery of the article to the holder 74 of the article carrier, the pivoted actuating arm 24 carrying the cam roll 26 is forced rearwardly quickly enough to withdraw the conveyer 18 and feed plunger 19 from the path of travel of the article as it is carried forward in the article holder. After the cam roll 26 has passed out of the cam track 28 in the cam 27, it rolls upon the outer face of said cam until it again enters the cam track to permit the feed plunger, conveyer and movable knife to perform their respective feeding and cutting functions. As heretofore explained, the rearward movement of the pivoted actuating arm 24 causes the conveyer 18 and feed plunger 19 to be brought to a position in which another unwrapped article is delivered to the conveyer in front of the feed plunger; it also causes the movable knife 54 to be withdrawn sufficiently to permit the web of wrapping material to pass between the cutting edges of the knives; and it also causes the rack bar 57 to drive the ratchet wheel 56 and thus rotate the wrapper feed rollers 38 sufficiently to supply the proper amount of wrapping material necessary to form a single wrapper. As will be seen upon reference to Fig. 3, the cam roll 26 carried by the feed plunger actuating arm 24, and the cam roll 51 mounted upon the pivoted arm 48 which intermittently draws the web of wrapping material from the reel 30, are so related to their actuating cam 27 that the web of wrapping material is withdrawn from the reel during the dwell of the said feed plunger actuating arm in a retracted position.

As the rotating carrier moves the article of merchandise to and past the flexibly mounted folder plate 76, the latter adjusts itself to the surface of the article and completes the folding of the wrapper around the sides thereof, as previously described.

Figure 6:
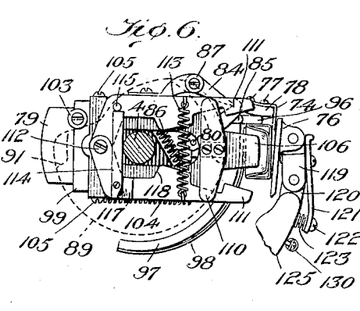
Figure 7:
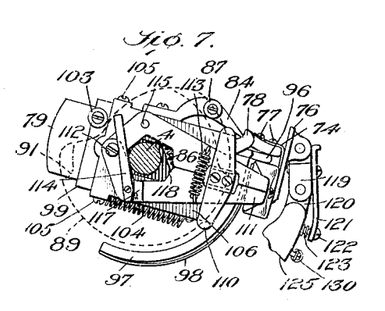
Figure 8:
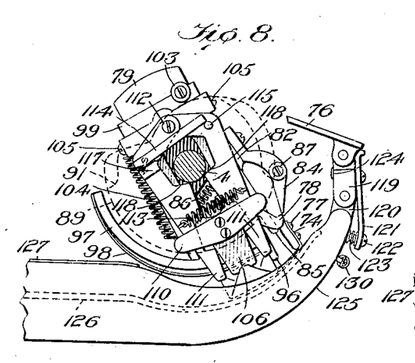
Figure 9:
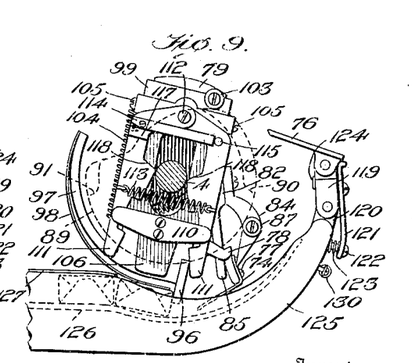

While the upper side of the partially wrapped article is still in contact with the plate 76, the cam roll 103, as shown in Figs. 6 and 7, reaches such a position with respect to the stationary cam 89 that the spring 104 is permitted to draw the folder finger supporting frame 99 toward the article holder 74 of the carrier, thus advancing the folding fingers 106 over the ends of the article and forming the initial end folds. Near the end of this sliding movement of the frame 99 toward the article holder, the pivoted latch bars 114 are disengaged from their locking abutments or pins 115, thus permitting the springs 113 to draw the wrapper engaging ends of the secondary folder fingers 111 together and fold the ends of the wrapper from each side over the initial end folds formed by the primary folding fingers 106. As shown in Fig. 8, and as heretofore described, the rectangular frame 99 is retracted and the primary and secondary folding fingers mounted thereon are released from engagement with the partially wrapped article as the cam roll 103 thereafter moves outwardly from the main shaft 4 over the surface of the stationary cam 89. The disengagement of the folding fingers 106 and 111 is preferably not finally accomplished until the article is well within the splay mouthed channel formed by the folder blades 125. When the rotation of the head 79 of the carrier by which the article is transported has advanced the cam roll 87 of the article holder locking and opening device to the shoulder 90 on the inner cam track of the stationary cam 89, the locking finger 84 is withdrawn from locking engagement with the yoke 78, and said yoke and the article holder 74 mounted thereon are rotated by the actuating arm 85 to release the article of merchandise from the holder. The holder 74 remains in this released or unlocked position until it passes the folder blades 125 and again approaches the position where another unwrapped article is delivered to the carrier by the conveyer 18 and feed plunger 19, when, the cam roll 87 having reached the depression 91 in the cam 89, the springs 81 and 86 return the article holder 74 and its locking mechanism to their locked positions. When the article holder 74 is withdrawn from engagement with the partially wrapped article, the latter is forced between the folder blades 125 by means of the article ejector 96, the final end folds of the wrapper being thus formed by the blades 125 and the completely wrapped article being moved into position under the flexible retaining strips 127 of the delivery chute. The completely wrapped articles are forced out of the delivery end of the chute by the entry of succeeding articles, as will be readily understood. The cycle of operations described is repeated at each rotation of the main shaft 4 and attached carrier.

Having thus described my invention, what I claim and desire to secure by Letters Patent is:

1. In a wrapping machine, the combination with a constantly moving carrier for transporting an article to be wrapped, of wrapper folding mechanism, and means movable into the path of the carrier for delivering an unwrapped article to the constantly moving carrier.

2. In a wrapping machine, the combination with a constantly moving carrier for transporting an article and the wrapper therefor, said carrier being provided with an article holder having its leading side open, of wrapper folding devices for completely folding the wrapper about the article as said article is transported by said carrier, and a plunger for delivering the article to the article holder through the open leading side thereof.

3. In a wrapping machine, the combination with a rotating carrier for transporting an article to be wrapped, of a folder plate extending into the path of travel of the article, said folder plate being supported on a bodily movable yielding pivot to permit the article to pass.

4. In a wrapping machine, the combination with a constantly moving carrier for transporting the article to be wrapped, said carrier being provided with a pivoted article holder, of wrapper folding mechanism mounted on said carrier and movable toward and from said holder, pivotally mounted plunger movable into the path of the carrier for delivering an article to the article holder of said carrier, and means for actuating said article delivering means.

5. In a wrapping machine, the combination with a rotating carrier for transporting an article and the wrapper therefor, of a magazine chute for containing the articles to be wrapped, means for folding the wrapper about the article, a reciprocating conveyer forming a closure for said chute and supporting an unwrapped article prior to its delivery to the carrier, a plunger slidably mounted in the conveyer for forcing the unwrapped article from the conveyer, and means for actuating said conveyer and said plunger.

6. In a wrapping machine, the combination with wrapper folding mechanism, of mechanism for feeding the articles to said wrapper folding mechanism, said article feeding mechanism comprising a magazine chute for containing the articles to be wrapped, a curved reciprocating conveyer adapted to form a closure for the chute and to support an article to be wrapped, a correspondingly curved plunger slidably mounted on said conveyer, and means for reciprocating said conveyer and plunger.

7. In a wrapping machine, the combination with wrapper folding mechanism, of mechanism for feeding the articles to said wrapper folding mechanism, said article feeding mechanism comprising a curved reciprocating conveyer of channel form, a correspondingly curved feed plunger slidably mounted in said conveyer, said conveyer and feed plunger having frictional engagement, and a pivoted member for actuating said conveyer and plunger.

8. In a wrapping machine, the combination with a constantly rotating shaft, of a stationary cam, a rotating cam, a constantly rotating carrier for transporting the article to be wrapped, means for feeding a continuous web of wrapping material to mechanism whereby it is cut into separate wrappers, mechanism for severing the web of wrapping material to form separate wrappers, means for delivering successive articles to the rotating carrier, and wrapper folding devices mounted upon said carrier, said rotating cam actuating said web feeding means, said web cutting mechanism and said article delivery means, and said stationary cam actuating said wrapper folding devices.

9. In a wrapping machine, the combination with a rotating carrier head, of a flexible article holder movably mounted thereon, means for locking said holder against movement on said head, and means which constantly tend to cause said holder to assume a locked position.

10. In a wrapping machine, the combination with a rotating carrier head, of an article holder pivotally mounted thereon, pivoted means for locking said holder against rotation on said head, means for unlocking said holder and causing it to rotate to an article releasing position, and a spring operating to rotate said holder to locked position.

11. In a wrapping machine, the combination with a rotating carrier head, of an article holder movably mounted on said head, a wrapper support connected to said head, said wrapper support having a flexible facing, and a yielding folder plate adapted to have sliding contact with said flexible facing.

12. In a wrapping machine, the combination with a rotating carrier head, of a wrapper folding finger movably mounted on the carrier head and adapted to form an end fold, and wrapper folding fingers movably mounted on said first named folding finger and adapted to form end folds at the same end of the wrapper.

13. In a wrapping machine, the combination with a rotating carrier head, of a wrapper folding finger slidably mounted on the carrier head and adapted to form an end fold, and wrapper folding fingers pivotally mounted on said slidably mounted finger and adapted to form end folds at the same end of the wrapper.

14. In a wrapping machine, the combination with a rotating carrier head, of a folder supporting frame slidably mounted thereon, wrapper folding fingers pivotally mounted on said frame and arranged on opposite sides of the carrier head, and a plurality of wrapper folding fingers pivotally mounted upon each of said first named fingers.

15. In a wrapping machine, the combination with a rotating carrier head, of an article holder movably mounted thereon, pivoted wrapper folding fingers which are slidably mounted upon said head so as to move toward and from said holder, a latch for preventing pivotal movement of the folding fingers except at a predetermined point in their sliding movement, and means for actuating said latch to permit a pivotal movement of the folding fingers.

16. In a wrapping machine, the combination with a rotating carrier head, of an article holder mounted thereon, a folder supporting frame slidably mounted on said head, a spring connecting said frame to said head and operating to move said frame toward said holder, oppositely disposed wrapper folding fingers pivotally mounted on said frame, springs interposed between said fingers and the frame, said springs constantly tending to move the wrapper engaging ends of said fingers toward each other, wrapper folding fingers pivotally mounted on each of said first named fingers, and means for causing said last named fingers to turn upon their pivots.

17. In a wrapping machine, the combination with a rotating carrier head, of an article holder pivotally mounted thereon, means for preventing the rotation of the article holder upon the carrier head, a wrapper support connected to said head, a curved flexible facing for said wrapper support, a wrapper folding plate which is adapted to slidingly engage said flexible facing, a cam actuated folder supporting frame slidably mounted on said head, a spring connecting said frame to said head, oppositely disposed wrapper folding fingers pivotally mounted on said frame, springs interposed between said fingers and the said frame, said springs constantly tending to move the wrapper engaging ends of said fingers toward each other, wrapper folding fingers pivotally mounted on said first named fingers, and springs for moving the wrapper engaging ends of said last named fingers toward each other.

18. In a wrapping machine, the combination with a movable article holder provided with a resilient plate, of flexible article guides arranged at the sides of said plate, and means for forcing the article to be wrapped beneath the resilient plate of said holder.

19. In a wrapping machine, the combination with a carrier head, of an article holder movably mounted thereon, an article ejector rigidly mounted on the carrier head adjacent to the said holder, means for moving said holder with respect to said head, and means for locking said holder against movement on said head.

20. In a wrapping machine, the combination with means for feeding a continuous web of wrapping material, of a fixed knife, a movable knife, flexible article guides engaging said fixed knife, means for feeding an article to be wrapped to said guides, and means for applying a wrapper to the article.

21. In a wrapping machine, the combination with means for feeding a continuous web of wrapping material, of relatively movable knives for severing said web, curved flexible article guides engaging one of said knives adjacent to its cutting edge, means for feeding an article to be wrapped to said guides, and means for applying a wrapper to the article.

22. In a wrapping machine, the combination with means for feeding a continuous web of wrapping material, of a fixed knife, a reciprocating knife, resilient means acting on said fixed knife to press it against the reciprocating knife, means for forcing an article to be wrapped into engagement with said resilient means, and means for applying a wrapper to the article.

23. In a wrapping machine, the combination with a magazine chute for containing the articles to be wrapped, of wrapper folding mechanism, means for delivering the articles from the said chute to the said wrapper folding mechanism, means for feeding a continuous web of wrapping material, a fixed knife, a reciprocating knife which is slotted to receive the magazine chute, and means for actuating said reciprocating knife.

In testimony whereof I affix my signature, in presence of two witnesses.

CLARENCE C. PAGE.

Witnesses:
  ARTHUR LANGGUTH,
  LYDIA MAY.